Patented Oct. 9, 1934

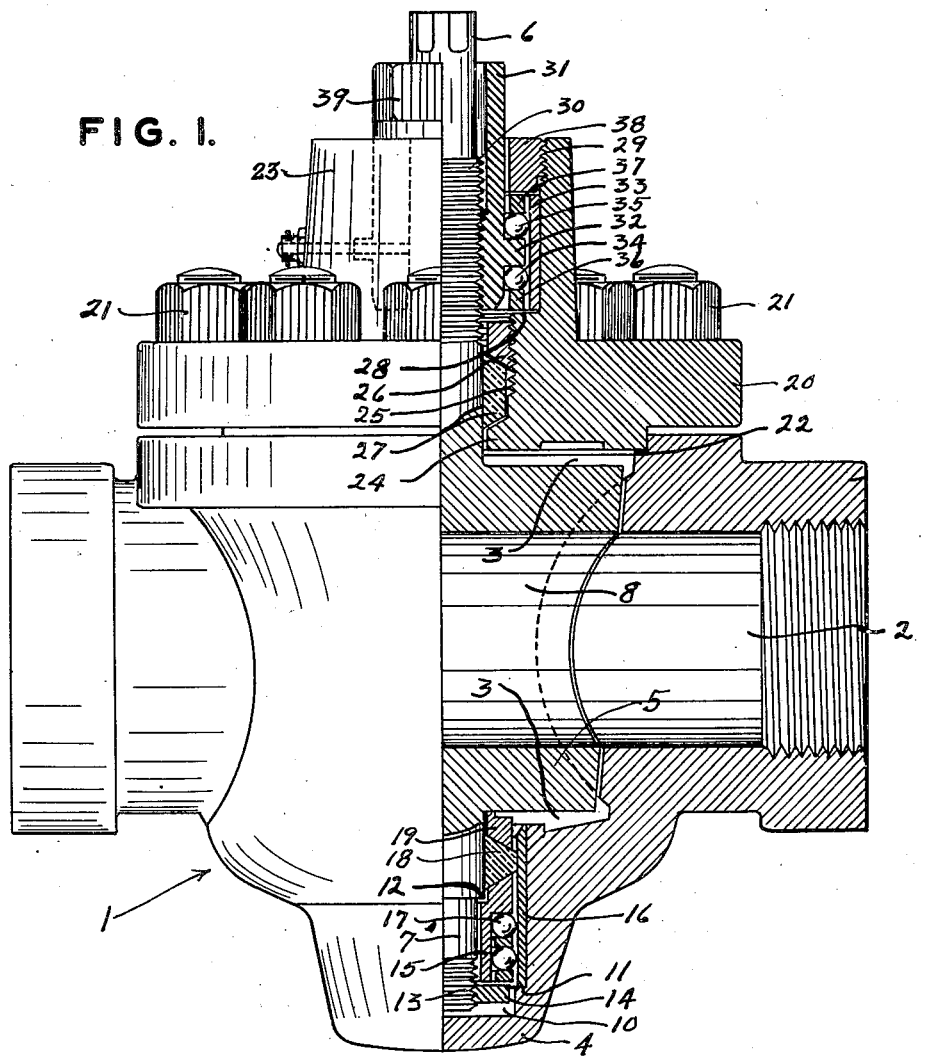

1,976,052

UNITED STATES PATENT OFFICE 1,976,052

VALVE

Benjamin B. Whittle, Oklahoma City, Okla.

Application January 22, 1934, Serial No. 707,668

3 Claims. (Cl. 251—113)

My invention relates to valves, and more particularly to valves of the stop-cock type designed particularly for use on high pressure flow lines.

By a valve of the stop-cock type is meant a device for regulating the flow of fluids through a pipe, consisting of a tapered substantially conical plug having a hole or port therethrough, and working rotatably in a rigid shell bored out to receive the plug, the shell having passages for connecting pipes at each end. Rotation of the plug controls the passage of fluids by either bringing the openings in the plug into alinement with those in the shell, or out of alinement therewith.

When used in controlling the flow of fluids under high pressures, stop-cock valves of usual design are prone, when open, to become wedged or frozen in the bore of the shell, and consequently when effort is made to close them it is found impossible to do so.

The present invention is an improvement over co-pending applications of similar title of Benjamin B. Whittle, said applications having been filed respectively on June 26, 1933; October 13, 1933; and December 16, 1933, and bearing, respectively, Serial Numbers 677,595; 684,803; and 702,754; and also over the co-pending joint application of Benjamin B. Whittle and Leland J. Towne dated and executed on the Third day of January, 1934, for patent for improvement in Valves, and filed in the United States Patent Office on the Eleventh day of January, 1934, under Serial No. 706,218.

The prime object of my invention is to provide a valve of the type described of which the mechanism is so arranged as to permit raising or lowering of the core or plug to desired positions without the upwardly moving of the mechanism operating to raise or lower the plug; and wherein the side thrust of the core is carried by the same mechanism as used for the raising or lowering of the core; and wherein the mechanism is so arranged that it can be submerged in oil during operation without the efficiency of the device being in any manner impaired by the oil in which it is submerged or by any extraneous matter carried thereby.

Other objects of the invention are: to provide a valve of the type described which is new, novel, practical and of utility; which is so designed that the movable parts thereof, other than the core, will be packed off from any fluid in the flow hole thereof; which is so designed that an end thrust on the core, usually occasioned by the pressure of flowing fluids, will not effect the relation of the core with the shell or housing; which is particularly adaptable for use in the control of extremely high pressures; which will require no gearing arrangement for its operation; which may be used and utilized also as a gate valve; which may be comparatively cheaply manufactured and installed; which will be compact; which is strong and durable; and, which will be efficient in accomplishing all the purposes for which it is intended.

With these and other objects in view as will more fully appear, my invention consists in the construction, novel features, and combination of parts hereinafter more fully described, pointed out in the claims hereto appended and illustrated in the accompanying one-sheet drawing, of which, The figure is a side elevational view of the device partially in section.

Like characters of reference designate like parts throughout the figure.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawing is to be interpreted as being illustrative and not restrictive.

A description of one practical embodiment of the invention follows:

The reference numeral 1 and arrow indicate as a whole a valve core or housing having a longitudinal flow-hole 2 therethrough, and which is adapted at each end to be connected in a pipe or flow line, not shown. The housing 1 intermediate its ends is provided with a transverse tapered bore 3 which extends through the upper wall and past the flow-hole 2 into the lower wall. The lower wall at this point is bulged outwardly to form a boss 4 and is made considerably thicker than at other points.

The bore 3 is adapted to receive a tapered valve core 5 which is mounted at its axis rigidly upon or made integral with an upper stem or shaft 6 and a lower axially alined shaft 7. The upper stem or shaft 6 is longer than the lower shaft 7, and both are preferably formed by turning down the material from which the core 5 is formed. Thus the stem or shaft 6 and shaft 7 are actually reduced continuations of the core, and are of a size sufficient to carry any side friction imposed upon the core by the flowing fluids in the line when the core has been raised out of contact with its seat in the housing.

The core 5 has a transverse through-perforation 8 adapted to form a continuation of the flow-hole 2 when the core is in a proper radial position, and is sufficiently large to completely obstruct the flow-hole 2 when turned ninety degrees from the position illustrated in the drawing.

The inner face of the boss 4 is centrally provided with a superficial bore 10 for receiving the lower shaft 7, and its upper portion is enlarged to form a shoulder 11. The lower portion of the bore 10 is somewhat greater in diameter than the diameter of the shaft 7.

The lower portion of the shaft 7 is reduced in diameter to form an abrupt shoulder 12 and its extreme lower end is provided with threads 13. The threads 13 engage a nut 14 upon which is seated a ball race 15 shouldered at its upper portion to engage the shoulder 12 upon the shaft 7 and which thereabove is bevelled upwardly and outwardly from the shaft. Seated upon the shoulder 11 within the bore 10 is a hardened bearing sleeve 16 which extends upwardly to the upper end of the bore 10. Confined within the race 15 are balls 17 which are of a diameter sufficiently great to prevent the race from contacting the sleeve 16. Around the stem 7 and upon the upper bevelled surface of the race 15 is provided resilient packing 18 and thereabove is a compression ring 19 which contacts the lower end of the core 5 when the nut 14 is tightened upwardly upon the shaft 7. It may be seen with this structure that should the core 5 be raised longitudinally with relation to the housing 1 that the bearing structure and packing will also be raised.

Completely closing the upper end of the bore 3 is a housing cap 20 held rigidly yet movable in place by a plurality of bolts and nuts 21 and the lower surface of which is packed by packing 22 to form a hermetical seal with the housing 1. The bore 3 is of a length sufficient to permit a limited upward movement of the core 5 without its contacting the lower surface of the cap 20. The cap 20 is provided with a central upstanding projection 23 which is centrally bored to permit its insertion over the shaft 6 and this bore at its extreme lower end is of a diameter only slightly greater than the diameter of the shaft 6, thus a packing seat 24 is provided having an upper bevelled surface which is bevelled upwardly and outwardly from the shaft. Above the seat 24 the bore is enlarged and provided with interior threads 25 and these threads receive a compression nut 26 for compressing a packing 27 between itself and the seat 24.

Above the compression nut 26 the bore of the cap is enlarged considerably to form an abrupt shoulder 28 and its extreme upper end is provided with interior threads 29.

Intermediate its ends the shaft 6 is equipped with threads 30 which are adapted to receive an interiorly threaded lifting nut 31, the lower portion of which is provided with an exterior annular projection 32. Seated upon the shoulder 28 is a hardened bearing sleeve 33 and both below and above the projection 32 are provided ball bearings 34 and 35. The bearings 34 are adapted to travel upon a race ring 36 and their upper surfaces contact and support the projection 32 the lower surface of which forms their upper race member. The upper balls 35 travel upon the upper surface of the projection 32 and are held in place thereon by an upper race ring 37. The whole bearing assembly as well as the sleeve 33 is held in place by a jamb-nut 38 which engages the previously described threads 29. The balls 34 and 35 are of a diameter sufficiently great to contact the inner surface of the sleeve 33 and prevent the rings 36 and 37 from contacting either the sleeve 33 or the lifting nut 31.

The upper exterior portion of the nut 31 is formed angularly as indicated by the reference numeral 39 so that it may be rotated by any means such as a wrench or the like.

*Operation*

In operating the core from a seated condition in either a closed or open position, which means that the core is at the lower end of its throw or in other words is wedged in the bore 3, it may be raised from its wedged position by rotation of the lifting nut 31. The nut is held against vertical movement by the jamb-nut 38, and consequently when it is rotated its threaded engagement with the shaft 6 causes the shaft to be raised. When in its raised position the core may be rotated to either an open or closed position by rotation of the stem 6. When this is done, the nut 31 rotates with the shaft rather than the shaft rotating within the nut, which is due to fact that the threaded engagement of the two members causes greater friction than that between the bearing balls 34 and 35 and the bearing sleeve 33. It will also be seen that the side thrust upon the core caused by the fluid in the flow line is carried entirely by the balls 34 and 35 and by the balls 17 when the core is in its unseated position; also that any upward thrust upon the core caused by said fluid whether the core is in a seated or an unseated position will be borne by the threaded connection between the stem or shaft 6 and the lifting nut 31 and consequently by the balls 35. The core may be forced to its seated or wedged position by rotating the nut 31 in an opposite direction.

When the core is either raised or lowered, or when the core is entirely removed from the housing, the lower bearing and packing structure is carried with the core.

It may be seen from the above description that any fluid flowing through the valve is entirely packed off from both the upper and lower working parts by the packings 18 and 27, and that the mechanism of the entire valve may be submerged in a liquid without impairing its function. This is due to the fact that the threaded engagement between the shaft 6 and the nut 31 will prevent ingress of such liquid. It may be found desirable to provide a suitable or conventional packing means between the jamb-nut 38 and the shaft 6, but it is thought that a machined fit will suffice to exclude such liquid unless considerable pressure is encountered.

Obviously, the invention is susceptible of embodiment in forms other than that which is illustrated in the accompanying drawing and described herein, and applicable, for uses and purposes other than as detailed, and I therefore consider as my own all such modifications and adaptations and other uses of the form of the device herein described as fairly fall within the scope of my invention.

Having thus described my invention, what is claimed and desired to be secured by Letters Patent, is:

1. In a valve of the stop-cock type, the combination with a housing, and with a core therein having a lower axial shaft upon which it is journaled, said housing having a chamber around said shaft somewhat greater in diameter than the diameter of the shaft, of a nut threadedly connected to the lower end portion of the shaft, a tubular member around the shaft and upon the nut and having an abrupt shoulder extending outwardly thereof, ball bearings around the member between the nut and the shoulder and held against lateral movement away from the member, a packing seat formed upon the upper face of said member, packing upon the seat, and a ring upon the packing and against the lower surface of the core.

2. In a valve of the stop-cock type, the combination with a housing, and with a core therein having a lower axial shaft upon which it is journaled, said housing having a chamber around said shaft somewhat greater in diameter than the diameter of the shaft, of a nut threadedly connected to the lower end portion of the shaft, a tubular member around the shaft and upon the nut and having an abrupt downwardly faced shoulder extending outwardly thereof, and ball bearings around the member between the nut and the shoulder and held against lateral movement away from the member and means for packing between the upper portion of the shaft and the wall of said chamber, said means including, the upper portion of the tubular member which acts as a seat for packing, packing upon the seat, and a ring upon the packing and against the lower surface of the core.

3. In a valve of the stop-cock type, the combination with a housing, and with a core therein having an upper and a lower axial shaft upon which it is journaled, of a cap for the housing around the upper shaft and having a bore somewhat greater in diameter than the diameter of said shaft, a lifting nut protruding above the cap and threadedly engaging the shaft, said nut having a protruding annular projection within said bore, ball bearings operably mounted in contact with both the upper and the lower surfaces of said projection and held against lateral movement away from the projection, means for holding the bearings against vertical movement with relation to the cap, said housing in its lower portion having a chamber around the lower shaft of somewhat greater diameter than the diameter of said shaft, a nut threadedly connected to the lower end portion of said shaft, a tubular member around the shaft and upon the nut and having an abrupt downwardly faced shoulder extending outwardly thereof, ball bearings around the member between the nut and the shoulder and held against lateral movement away from the member, and means for packing between the upper portion of the lower shaft and the wall of said chamber, said means including the upper portion of the tubular member which acts as a seat for packing, packing upon the seat, and a ring upon the packing and against the lower surface of the core.

BENJAMIN B. WHITTLE.